United States Patent
Kim et al.

(10) Patent No.: US 9,494,728 B2
(45) Date of Patent: Nov. 15, 2016

(54) LIQUID CRYSTAL DISPLAY

(71) Applicant: SAMSUNG DISPLAY CO., LTD., Yongin, Gyeonggi-Do (KR)

(72) Inventors: Hyoung-Joo Kim, Anyang-si (KR); Dongyeon Kang, Seoul (KR); Sangwoo Ha, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 35 days.

(21) Appl. No.: 14/682,334

(22) Filed: Apr. 9, 2015

(65) Prior Publication Data

US 2015/0355506 A1    Dec. 10, 2015

(30) Foreign Application Priority Data

Jun. 9, 2014  (KR) .......................... 10-2014-0069364

(51) Int. Cl.
*F21V 8/00* (2006.01)
*G02F 1/1335* (2006.01)
*G02F 1/1333* (2006.01)

(52) U.S. Cl.
CPC ........... *G02B 6/0053* (2013.01); *G02B 6/0031* (2013.01); *G02B 6/0051* (2013.01); *G02B 6/0073* (2013.01); *G02B 6/0083* (2013.01); *G02F 1/1336* (2013.01); *G02F 2001/133317* (2013.01)

(58) Field of Classification Search
CPC .................. G02B 6/053; G02B 6/0031; G02B 6/0015; G02B 6/0073; G02B 6/0083; G02F 1/1336; G02F 2001/133317

USPC .......................................... 362/611, 612, 613
See application file for complete search history.

(56) References Cited

U.S. PATENT DOCUMENTS

| | | | |
|---|---|---|---|
| 6,123,430 A * | 9/2000 | Ono ..................... | G02B 6/0055 362/23.15 |
| 7,800,730 B2 | 9/2010 | Kang et al. | |
| 8,319,909 B2 | 11/2012 | Oohira | |
| 2004/0004827 A1* | 1/2004 | Guest ................... | G02B 6/0091 362/612 |
| 2007/0139961 A1* | 6/2007 | Cheah ................. | G02B 6/0065 362/612 |
| 2010/0128198 A1 | 5/2010 | Kim et al. | |
| 2010/0253872 A1 | 10/2010 | Park et al. | |
| 2012/0086890 A1 | 4/2012 | Shimokawa et al. | |
| 2013/0107171 A1* | 5/2013 | Lee ..................... | G02B 6/0031 349/67 |
| 2013/0107567 A1 | 5/2013 | Lin et al. | |

FOREIGN PATENT DOCUMENTS

| | | |
|---|---|---|
| JP | 2009-301912 A | 12/2009 |
| JP | 2010-135188 A | 6/2010 |

(Continued)

*Primary Examiner* — Laura Tso
(74) *Attorney, Agent, or Firm* — Lee & Morse P.C.

(57) ABSTRACT

A liquid crystal display includes a display panel receiving light to display an image, and a backlight assembly emitting the light to the display panel, the backlight assembly including a light emitting unit emitting the light, a light guide plate coupled to the light emitting unit, the light guide plate guiding the light emitted from the light emitting unit to the display panel, and a reflective adhesive member including a light reflective material, the reflective adhesive member surrounding the light emitting unit and coupling the light emitting unit to the light guide plate.

19 Claims, 5 Drawing Sheets

(56) References Cited

FOREIGN PATENT DOCUMENTS

| KR | 10-2010-0050136 A | 5/2010 |
| KR | 10-2011-0038871 A | 4/2011 |
| KR | 10-2012-0018979 A | 3/2012 |
| KR | 10-2013-0067685 A | 6/2013 |

* cited by examiner

LIQUID CRYSTAL DISPLAY

CROSS-REFERENCE TO RELATED APPLICATION

Korean Patent Application No. 10-2014-0069364, filed on Jun. 9, 2014, in the Korean Intellectual Property Office, and entitled: "Liquid Crystal Display," is incorporated by reference herein in its entirety.

BACKGROUND

1. Field

The present disclosure relates to a liquid crystal display. More particularly, the present disclosure relates to a liquid crystal display having a backlight assembly.

2. Description of the Related Art

In recent years, various display devices have been developed to be applicable to a portable information processing device, such as a tablet computer, a notebook computer, etc. In addition to ways to improve a display quality of the display devices, various approaches have been studied to reduce the display devices in size and weight.

SUMMARY

Embodiments provide a liquid crystal display including a display panel receiving light to display an image, and a backlight assembly emitting the light to the display panel, the backlight assembly having a light emitting unit emitting the light a light guide plate coupled to the light emitting unit, the light guide plate guiding the light emitted from the light emitting unit to the display panel, and a reflective adhesive member including a light reflective material, the reflective adhesive member surrounding the light emitting unit and coupling the light emitting unit to the light guide plate.

The backlight assembly may further include a reflection member attached to a bottom surface of the light guide plate. The light emitting unit may be disposed adjacent to a side portion of the light guide plate, and the reflective adhesive member may be attached to the side portion of the light guide plate and the reflection member to surround the light emitting unit.

The backlight assembly may further include a first adhesive member disposed between the bottom surface of the light guide plate and the reflection member to attach the reflection member to the light guide plate. The first adhesive member may have a light transmissive property.

The reflection member may be coated on the bottom surface of the light guide plate.

The light emitting unit may include a light emitting diode package facing the side portion of the light guide plate and a printed circuit board electrically connected to the light emitting diode package. The backlight assembly may further include a second adhesive member disposed between the printed circuit board and the reflection member to attach the printed circuit board to the reflection member.

The liquid crystal display may further include a third adhesive member disposed between the display panel and the backlight assembly to attach the display panel to the backlight assembly. The third adhesive member may extend along an edge of the display panel to correspond to a non-display area of the display panel. The third adhesive member may have a light blocking property.

The light emitting unit may be disposed adjacent to the side portion of the light guide plate, and the reflective adhesive member may be attached to the display panel and the reflection member to surround the light emitting unit. The backlight assembly further may include a fourth adhesive member disposed between the printed circuit board and the display panel to attach the printed circuit board to the display panel.

The light guide plate may include a light exit pattern and the light exit pattern is disposed on an upper surface of the light guide plate, which faces the bottom surface.

The light guide plate may include a light exit pattern and the light exit pattern is disposed on the bottom surface of the light guide plate.

The backlight assembly may further include an optical sheet disposed between the display panel and the light guide plate and attached to the display panel.

The liquid crystal display may further include a window substrate having a light transmissive property and covering the display panel, a touch screen panel coupled to the window substrate to sense a position at which a touch event occurs on the window substrate, and a housing accommodating the display panel and the backlight assembly. The housing may include a receiving space to receive a battery.

The display panel may have a size equal to or smaller than about 14 inches.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
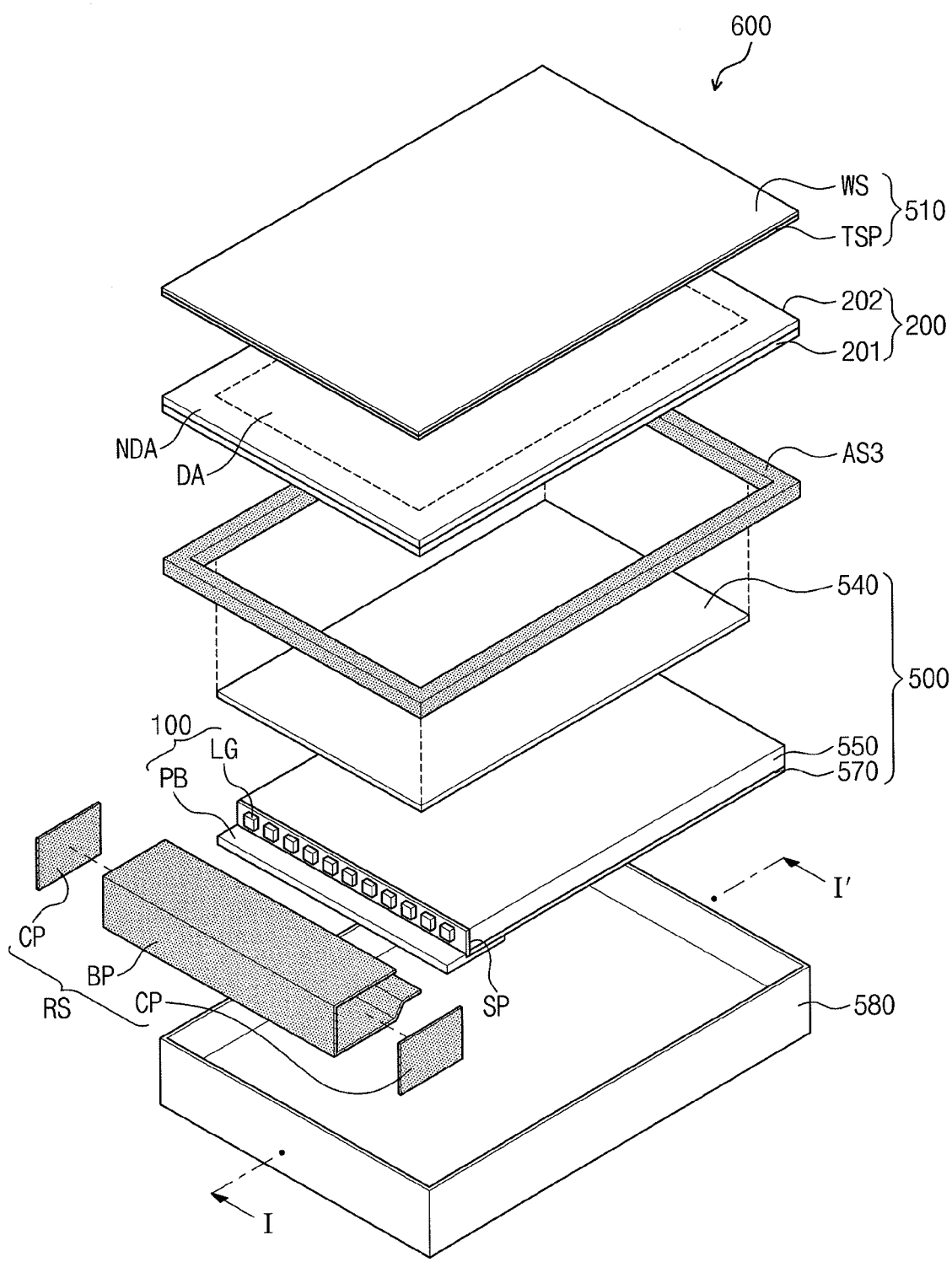
FIG. 1 illustrates an exploded perspective view showing a liquid crystal display according to an exemplary embodiment of the present disclosure.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 2:
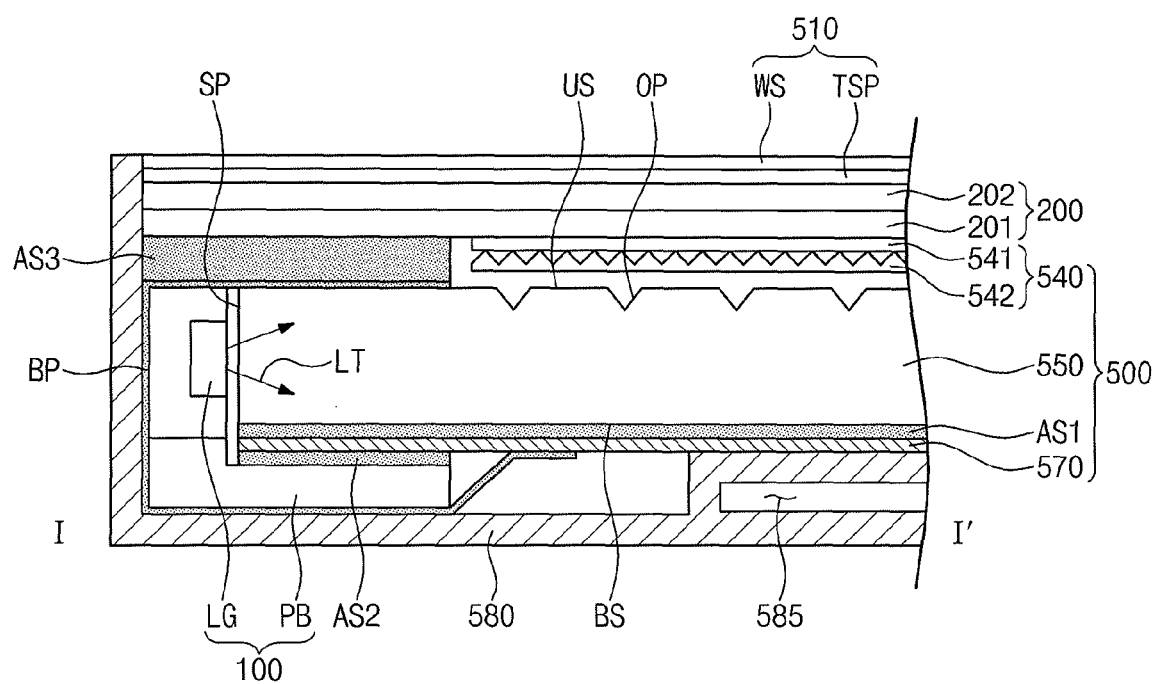
FIG. 2 illustrates a cross-sectional view taken along a line I-I' of FIG. 1.

FIG. 1 is an exploded perspective view showing a liquid crystal display according to an exemplary embodiment of the present disclosure, and FIG. 2 is a cross-sectional view taken along line I-I' of FIG. 1.

Referring to FIGS. 1 and 2, a liquid crystal display 600 may include a display panel 200, a backlight assembly 500, a window assembly 510, and a housing 580. In the present exemplary embodiment, the liquid crystal display 600 may be applicable to a portable information processing device, e.g., a tablet computer. For example, the display panel 200 may have a size of about 14 inches or less. For instance, the display panel 200 may have a size of about 10 inches or less.

The display panel 200 includes a display area DA and a non-display area NDA surrounding the display area DA. The display panel 200 receives light generated from the backlight assembly 500 to display an image through the display area DA.

In the present exemplary embodiment, the display panel 200 may be a liquid crystal display panel. In this case, the display panel 200 may include a display substrate 201, an opposite substrate 202, and a liquid crystal layer (not shown) interposed between the display substrate 201 and the opposite substrate 202. The display substrate 201 includes a plurality of pixels disposed in the display area DA, and each pixel includes a pixel electrode (not shown) and a thin film transistor (not shown) connected to the pixel electrode to switch a data signal applied to the pixel electrode. The opposite substrate 202 includes a common electrode (not shown) facing the pixel electrodes and a color filter (not shown) filtering the light passing through the liquid crystal layer into a colored light.

The display panel 200 may have the above-described structure, but the structure of the display substrate 201 and the opposite substrate 202 should not be limited thereto or thereby. For instance, according to embodiments, the common electrode may be disposed on the display substrate 201 and spaced apart from the pixel electrodes, and the color filter may be disposed on the display substrate 201 and overlap the pixel electrodes instead of being disposed on the opposite substrate 202.

The backlight assembly 500 may include a light emitting unit 100, a reflection member 570, a light guide plate 550, an optical sheet 540, and a reflective adhesive member RS.

The light emitting unit 100 generates an exit light LT, and the exit light LT is incident on the light guide plate 550. The light emitting unit 100 may include a printed circuit board PB and a plurality of light emitting diode packages LG. The light emitting diode packages LG are mounted on the printed circuit board PB and are electrically connected to the printed circuit board PB, and the light emitting diode packages LG receive a source voltage from the printed circuit board PB to emit the exit light LT.

The light emitting unit 100 is disposed adjacent to a side portion SP of the light guide plate 550, and the printed circuit board PB extends along the side portion SP of the light guide plate 550. In addition, the light emitting diode packages LG are arranged along a same direction as the printed circuit board PB, i.e., a direction in which the printed circuit board PB extends, and are spaced apart from each other.

In the present exemplary embodiment, the light emitting diode packages LG are arranged along the side portion SP of the light guide plate 550, but the positions and the number of the light emitting diode packages LG should not be limited thereto or thereby. For instance, according to embodiments, another light emitting unit may further be disposed adjacent to the other side portion of the light guide plate 550, which faces the side portion SP, in addition to the light emitting unit 100. Also, according to embodiments, one light emitting diode package may be disposed adjacent to a corner portion of the light guide plate 550, and in this case, the one light emitting diode package may face a chamfered surface of the corner portion of the light guide plate 550 to emit light to the chamfered surface.

The reflection member 570 is attached to the light guide plate 550. More particularly, the light guide plate 550 includes a bottom surface BS and an upper surface US facing the bottom surface BS. A distance between the upper surface US to the display panel 200 is smaller than a distance between the bottom surface BS and the display panel 200, and the reflection member 570 is attached to the bottom surface BS. The reflection member 570 serves as a single unitary and individual unit with the light guide plate 550.

The reflection member 570 includes a reflective material to have a light reflection property. For instance, the reflection member 570 may be an enhanced specular reflection (ESR) film having a specular reflection property or a film of polyethylene terephthalate (PET).

The backlight assembly 500 may further include a first adhesive member AS1, a second adhesive member AS2, and a third adhesive member AS3.

The first adhesive member AS1 is disposed between the, e.g., entire, bottom surface BS and the reflection member 570, and thus the reflection member 570 is attached to the light guide plate 550 by the first adhesive member AS1. The first adhesive member AS1 has a light transmittance property, and may be, but is not limited to, an optically clear adhesive (OCA).

The second adhesive member AS2 is disposed between the printed circuit board PB and the reflection member 570 to attach the printed circuit board PB to the reflection member 570. Accordingly, the light emitting unit 100 is fixed to the light guide plate 550. The second adhesive member AS2 may be, but is not limited to, a double-sided adhesive tape.

The third adhesive member AS3 is disposed between the display panel 200 and the backlight assembly 500 to attach the display panel 200 to the backlight assembly 500. The third adhesive member AS3 extends along an edge of the display panel 200. For example, the third adhesive member AS3 extends along the non-display area NDA of the display panel 200, e.g., the third adhesive member AS3 may have a frame shape surrounding an edge of the display panel 200 and overlapping the entire non-display area NDA of the display panel 200. The third adhesive member AS3 has a light blocking property.

Since the display panel 200 is attached to the backlight assembly 500 by the third adhesive member AS3, a mold frame, e.g., used to couple a backlight assembly and a display panel, may be omitted from the structure of the display device 600 according to the present exemplary embodiment. Therefore, a size and a weight of the display panel 600 are reduced, and thus transportability of the display device 600 is improved.

In addition, when a mold frame is omitted in a backlight assembly, a mechanical strength may potentially be deteriorated. However, since the size of the display panel 200 becomes about 14 inches or less in the present exemplary embodiment, the deterioration in mechanical strength may be compensated by the rigidity of each of the display panel 200 and the light guide plate 550.

The exit light LT is incident on the light guide plate 550, and the light guide plate 550 guides the exit light LT to the display panel 200 using a light exit pattern OP. In the present exemplary embodiment, the light exit pattern OP is disposed on the upper surface US.

The optical sheet 540 is disposed between the display panel 200 and the light guide plate 550 and is attached to the display panel 200. Thus, the optical sheet 540 and the display panel 200 may serve as a single unitary and individual unit.

The optical sheet 540 includes a diffusion sheet 541 and a prism sheet 542. The prism sheet 542 condenses the light exiting from the light guide plate 550, and the diffusion sheet 541 diffuses the light condensed by the prism sheet 542.

The reflective adhesive member RS includes a reflective material and surrounds the light emitting unit 100 to couple the light emitting unit 100 to the light guide plate 550. In more detail, the reflective adhesive member RS includes a bending portion BP and cover portions CP. The bending portion BP extends downward from an upper side of the light guide plate 550 to a lower side of the light guide plate 550 and has a bent shape, e.g., an approximate rotated 'U' shape. In detail, as illustrated in FIG. 2, the bending portion BP is attached to, e.g., overlaps, the upper surface US of the light guide plate 550, the side portion SP, and the reflection member 570 to surround the light emitting unit 100. In addition, the cover portions CP are coupled to the bending portion BP to cover both sides of the light emitting unit 100. Thus, the exit light LT emitted from the light emitting unit 100 is prevented from leaking outwardly by using the reflective adhesive member RS, and the light emitting unit 100 and the light guide plate 550 are coupled to each other by the reflective adhesive member RS.

The reflective adhesive member RS may be, but is not limited to, an enhanced specular reflection (ESR) film having an adhesive property. According to embodiments, the bending portion BP and the cover portions CP may be integrally formed as a single unitary and individual unit.

As shown in the present exemplary embodiment, the light emitting unit 100 and the light guide plate 550 are coupled to each other by the reflective adhesive member RS and the second adhesive member AS2, the light guide plate 550 and the reflection member 570 are coupled to each other by the first adhesive member AS1, and the backlight assembly 500 and the display panel 200 are coupled to each other by the third adhesive member AS3. Consequently, a bottom chassis may be omitted from the display device 600.

In general, a bottom chassis accommodates elements of the backlight assembly and the display panel therein to set all elements of the display device in one set. According to the present exemplary embodiment, however, all elements of the display device 600 may be realized in one set by the first, second, and third adhesive members AS1, AS2, and AS3, as well as the reflective adhesive member RS, even though the bottom chassis is omitted from the display device 600.

The window assembly 510 covers the display panel 200. The window assembly 510 includes a window substrate WS and a touch screen panel TSP. The window substrate WS is disposed at an uppermost portion of the display panel 200, and is exposed to the outside of the display device 600. The window substrate WS has a light transmissive property corresponding to the display area DA.

The touch screen panel TSP is coupled to the window substrate WS to sense a position at which a touch event occurs on the window substrate WS. In the present exemplary embodiment, the touch screen panel TSP is driven in a capacitive type, however, it should not be limited thereto or thereby. That is, the touch screen panel TSP may be driven in a resistive film type, an ultrasonic type, or an infrared type.

Although not shown in the figures, an adhesive film having a light transmissive property, e.g., an optically clear adhesive (OCA), may be disposed between the touch screen panel TSP and the display panel 200. The window assembly 510 is attached to the display panel 200 by the adhesive film.

The housing 580 accommodates the display panel 200 and the backlight assembly 500. In the exemplary embodiment, the housing 580 serves as a case to accommodate the display panel 200 and the backlight assembly 500, and includes various spaces defined therein to accommodate elements required to drive the display device 600. For instance, a space 585 is defined in the housing 580 (FIG. 2) in order to accommodate, e.g., a battery, a memory card, a driving circuit board that generates a driving signal to drive the display panel 200, an antenna, etc.

Figure 3:
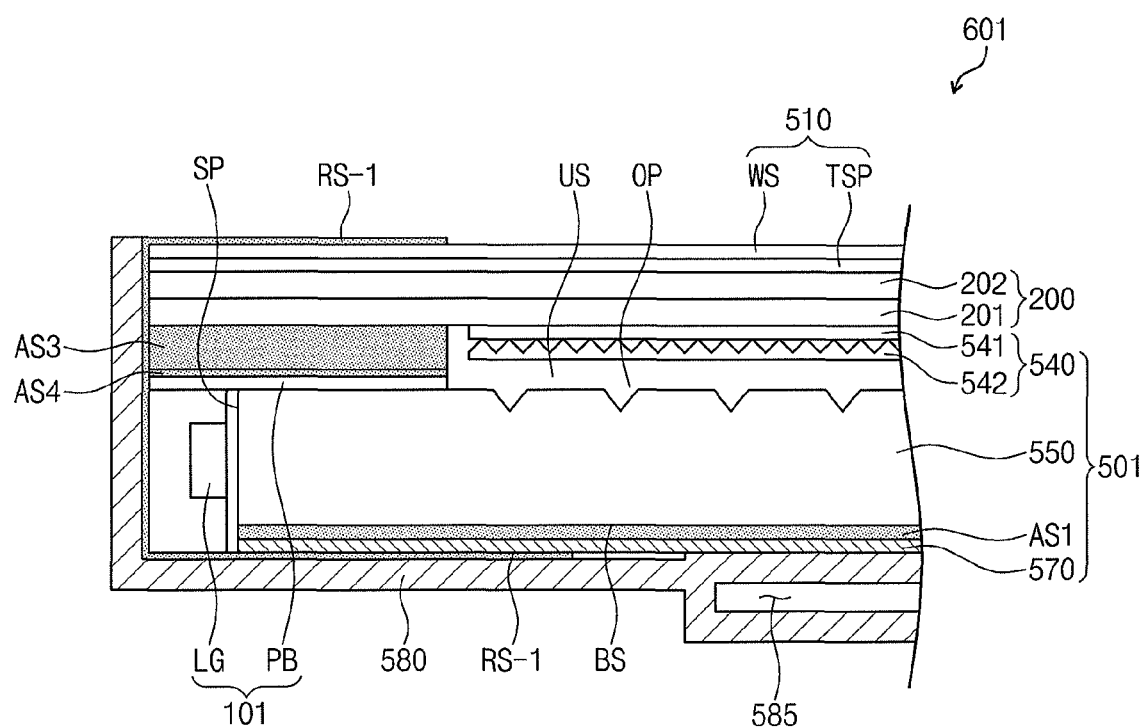
FIG. 3 illustrates a cross-sectional view showing a display device according to another exemplary embodiment of the present disclosure.

FIG. 3 is a cross-sectional view showing a display device according to another exemplary embodiment of the present disclosure. In FIG. 3, the same reference numerals denote the same elements as in FIGS. 1 and 2, and thus the detailed descriptions of the same elements will be omitted.

Referring to FIG. 3, a display device 601 may include the display panel 200, the window assembly 510, and a backlight assembly 501. The backlight assembly 501 may include a light emitting unit 101, a reflective adhesive member RS-1, and a fourth adhesive member AS4.

The light emitting unit 101 may include the printed circuit board PB and the light emitting diode package LG. In the present exemplary embodiment, the printed circuit board PB is attached to the display panel 200. In detail, the fourth adhesive member AS4 is attached to the third adhesive member AS3 and is disposed between the printed circuit board PB and the display panel 200. Thus, the printed circuit board PB is attached to the display panel 200. The fourth adhesive member AS4 may be, but is not limited to, a double-sided adhesive tape.

In addition, the reflective adhesive member RS-1 is attached to the display panel 200 and the reflection member 570 to surround the light emitting unit 101. More particularly, the reflective adhesive member RS-1 is attached to an upper surface of the window assembly 510, a side surface of the display panel 200, and the reflection member 570 to surround the light emitting unit 101. Thus, light emitted from the light emitting unit 101 is prevented from outwardly leaking by using the reflective adhesive member RS-1, and the light emitting unit 101 and the light guide plate 550 are coupled to each other.

Figure 4:
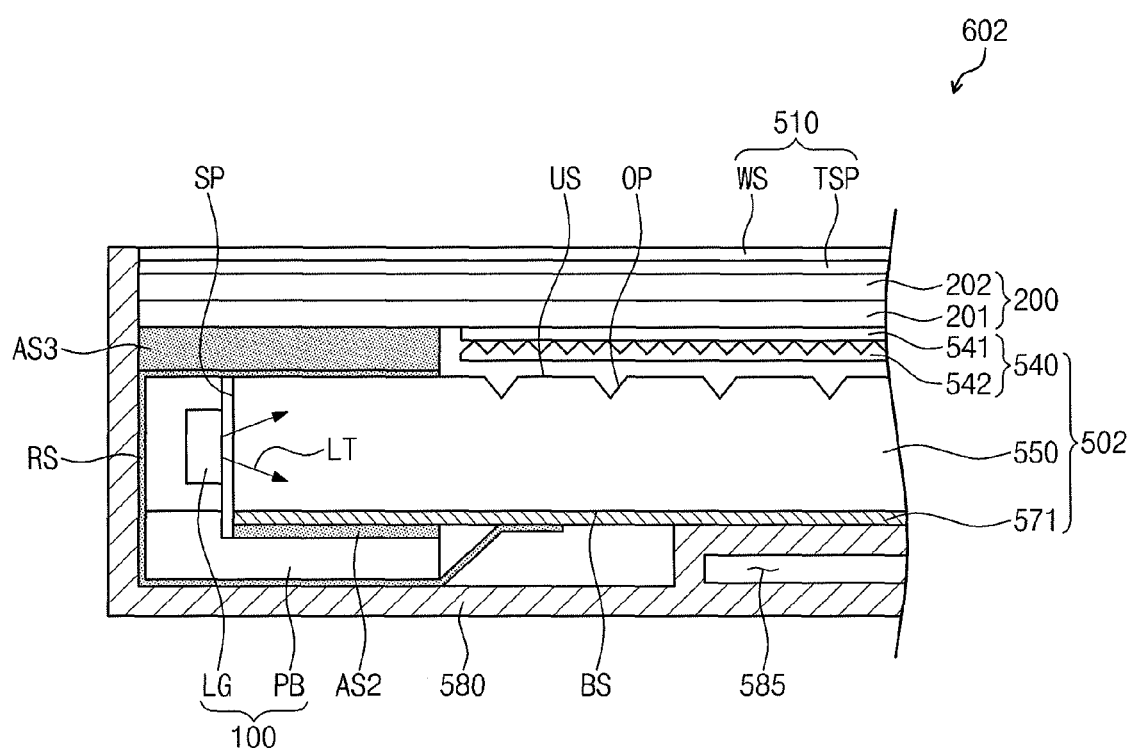
FIG. 4 illustrates a cross-sectional view showing a display device according to another exemplary embodiment of the present disclosure.

FIG. 4 is a cross-sectional view showing a display device according to another exemplary embodiment of the present disclosure. In FIG. 4, the same reference numerals denote the same elements as in FIGS. 1-3, and thus the detailed descriptions of the same elements will be omitted.

Referring to FIG. 4, a display device 602 may include the display panel 200, the window assembly 510, and a backlight assembly 502.

In the present exemplary embodiment, a reflection member 571 is coated on the bottom surface BS of the light guide plate 550. For instance, the reflection member 571 is formed by depositing a reflective material, such as titanium dioxide ($TiO_2$), silver (Ag), etc., on the bottom surface BS or by coating a white paint on the bottom surface BS.

According to the exemplary embodiments shown in FIGS. 1 and 2, the reflection member 570 (refer to FIG. 2) is attached to the bottom surface BS of the light guide plate 550 by the first adhesive member AS1 (refer to FIG. 2). However, since the reflection member 571 is coated on the bottom surface BS in the present exemplary embodiment, an assembling process of the elements included in the backlight assembly 502 may be simplified.

Figure 5:
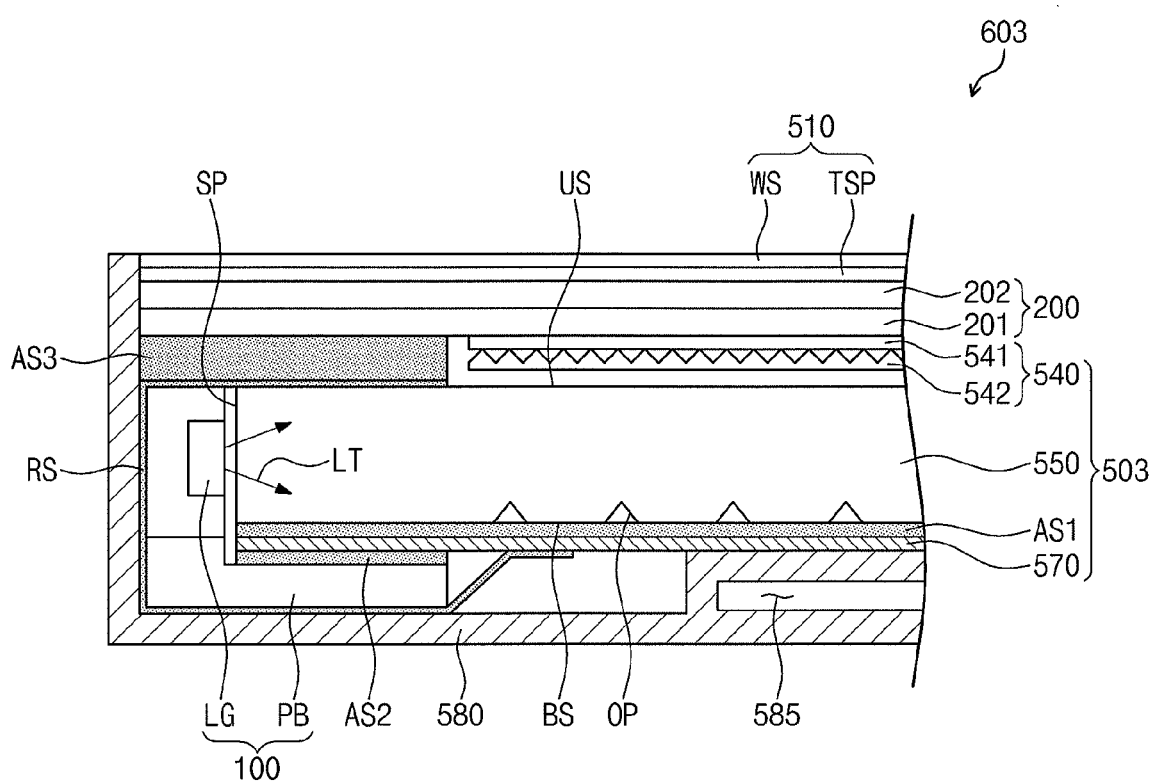
FIG. 5 illustrates a cross-sectional view showing a display device according to another exemplary embodiment of the present disclosure.

FIG. 5 is a cross-sectional view showing a display device according to another exemplary embodiment of the present disclosure. In FIG. 5, the same reference numerals denote the same elements shown in previous embodiments, and thus the detailed descriptions of the same elements will be omitted.

Referring to FIG. 5, a display device 603 may include the display panel 200, the window assembly 510, and a backlight assembly 503.

In the present exemplary embodiment, the light exit pattern OP of the light guide plate 550 is disposed on the bottom surface BS of the light guide plate 550, and the reflection member 570 is attached to the bottom surface BS, on which the light exit pattern OP is formed, by a first adhesive member AS1. According to embodiments, the reflection member 570 may be coated on the bottom surface BS on which the light exit pattern OP is formed as shown in FIG. 4.

By way of summary and review, when a display device includes a backlight assembly, approaches have been researched to reduce the number of elements of the backlight assembly and to decrease the weight of the backlight assembly. Therefore, the present disclosure provides a display device, e.g., a liquid crystal display, having a reduced size and weight.

That is, as described above, embodiments provide a liquid crystal display with a reflective adhesive member surrounding a light emitting unit and attached to a light guide plate. Therefore, the light emitting unit and the light guide plate are coupled to each other by the reflective adhesive member, and the light guide plate and the reflection member disposed under the light guide plate are coupled to each other. Thus, a conventional bottom chassis used to accommodate the light emitting unit, the light guide plate, and the reflection member in a conventional display device may be omitted from the backlight assembly.

In addition, the display panel is attached to the backlight assembly by the adhesive member and the optical sheet is attached to the display panel by another adhesive member. Accordingly, a mold frame used to couple the backlight assembly to the display panel in a conventional display device may be omitted from the display device.

Therefore, the structure of the display device may be simplified since the bottom chassis and the mold frame are omitted from the display device. Further, the size and the weight of the display device are reduced, thereby improving transportability of the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A liquid crystal display, comprising:
a display panel receiving light to display an image; and
a backlight assembly emitting the light to the display panel, the backlight assembly including:
a light emitting unit emitting the light,
a light guide plate coupled to the light emitting unit, the light guide plate guiding the light emitted from the light emitting unit to the display panel, and
a reflective adhesive member including a light reflective material, the reflective adhesive member surrounding the light emitting unit and coupling the light emitting unit to the light guide plate.
2. The liquid crystal display as claimed in claim 1, wherein the backlight assembly further comprises a reflection member attached to a bottom surface of the light guide plate.
3. The liquid crystal display as claimed in claim 2, wherein the light emitting unit is adjacent to a side portion of the light guide plate, and the reflective adhesive member is attached to the side portion of the light guide plate and the reflection member to surround the light emitting unit.
4. The liquid crystal display as claimed in claim 2, wherein the backlight assembly further comprises a first adhesive member between the bottom surface of the light guide plate and the reflection member to attach the reflection member to the light guide plate.

5. The liquid crystal display as claimed in claim 4, wherein the first adhesive member is light transmissive.

6. The liquid crystal display as claimed in claim 2, wherein the reflection member is coated on the bottom surface of the light guide plate.

7. The liquid crystal display as claimed in claim 2, wherein the light emitting unit includes:
 a light emitting diode package facing a side portion of the light guide plate; and
 a printed circuit board electrically connected to the light emitting diode package,
 wherein the backlight assembly further comprises a second adhesive member between the printed circuit board and the reflection member to attach the printed circuit board to the reflection member.

8. The liquid crystal display as claimed in claim 2, further comprising a third adhesive member between the display panel and the backlight assembly to attach the display panel to the backlight assembly.

9. The liquid crystal display as claimed in claim 8, wherein the third adhesive member extends along an edge of the display panel to correspond to a non-display area of the display panel.

10. The liquid crystal display as claimed in claim 8, wherein the third adhesive member exhibits light blocking properties.

11. The liquid crystal display as claimed in claim 2, wherein the light emitting unit is adjacent to a side portion of the light guide plate, and the reflective adhesive member is attached to the display panel and the reflection member to surround the light emitting unit.

12. The liquid crystal display as claimed in claim 11, wherein the light emitting unit includes:
 a light emitting diode package facing the side portion of the light guide plate; and
 a printed circuit board electrically connected to the light emitting diode package,
 wherein the backlight assembly further comprises a fourth adhesive member between the printed circuit board and the display panel to attach the printed circuit board to the display panel.

13. The liquid crystal display as claimed in claim 2, wherein the light guide plate includes a light exit pattern, the light exit pattern being on an upper surface of the light guide plate, and the upper and bottom surfaces of the light guide plate being opposite each other.

14. The liquid crystal display as claimed in claim 2, wherein the light guide plate includes a light exit pattern, the light exit pattern being on the bottom surface of the light guide plate.

15. The liquid crystal display as claimed in claim 1, wherein the backlight assembly further comprises an optical sheet between the display panel and the light guide plate, the optical sheet being attached to the display panel.

16. The liquid crystal display as claimed in claim 15, wherein the optical sheet includes:
 a diffusion sheet diffusing the light exiting from the light guide plate; and
 a prism sheet attached to the diffusion sheet to condense the light exiting from the light guide plate.

17. The liquid crystal display as claimed in claim 1, further comprising:
 a window substrate having a light transmissive property and covering the display panel;
 a touch screen panel coupled to the window substrate to sense a position at which a touch event occurs on the window substrate; and
 a housing accommodating the display panel and the backlight assembly.

18. The liquid crystal display as claimed in claim 17, wherein the housing includes a receiving space to receive a battery.

19. The liquid crystal display as claimed in claim 17, wherein the display panel has a size equal to or smaller than about 14 inches.

* * * * *